United States Patent Office 3,162,570
Patented Dec. 22, 1964

3,162,570
ORGANOPHOSPHORUS COMPOUNDS AS INSECTICIDES AND NEMATOCIDES
John Henry Wilson, Jr., Richmond, Va., assignor to Socony Mobil Oil Company, Inc., a corporation of New York
No Drawing. Filed May 21, 1962, Ser. No. 196,492
11 Claims. (Cl. 167—22)

This invention relates to methods for the control of insects and/or nematodes. More particularly, the invention relates to their control using compounds represented by the formula

RPX wherein R is an alkyl group containing from 1 to 6 carbon atoms, inclusive, and X is a member of the group consisting of —(SR′)$_2$, —(S)(SR′)$_2$ and —(O)(SR′)$_2$, in which the said R′ has the same definition as R.

As can be seen by the above general formula, the subject pests are to be controlled with three separate classes of compounds. These separate classes are shown by the following formulas:

(1)     RP(SR′)$_2$
(2)     RP(S)(SR′)$_2$
(3)     RP(O)(SR′)$_2$ wherein R and R′ have the same meaning as above.

Thiophosphonous and thiophosphonic acid esters have been found to be important additions to the pesticide field. The present work has shown them to be particularly useful in the insecticidal and nematocidal arts, and several of the compounds of this invention have both activities. Those which are not nematicides and insecticides will be found to possess at least one of the activities.

The compounds disclosed herein as insecticides and/or nematocides may be prepared essentially according to the following schemes:

(1)   2R′SH+RPCl$_2$→RP(SR′)$_2$+2HCl
(2)   RP(SR′)$_2$+(S)→RP(S)(SR′)$_2$
(3)   RP(SR′)$_2$+(O)→RP(O)(SR′)$_2$

Reaction (1) may be carried out at temperatures up to about 25°. Additionally an inert organic solvent may be used if desired, and either a tertiary amine or an alkali metal hydroxide may be used as the halogen acid acceptor. (2) is preferably run at about 100° C., regulating the temperature by the rate of addition of elemental sulfur (or other sulfurizing agent) to a compound obtained in (1), or by adding all of the sulfur at once and alternately heating and cooling. The compounds of (3) may be made by adding an oxidizing agent such as hydrogen peroxide to a compound from (1), while maintaining the temperature at about 80° C.

The phosphorus organic compounds of the invention are effective as insecticides and/or nematocides at low concentrations. Because of the very low amounts required for effective control, it is generally impracticable to apply the compounds as such. It is desirable, therefore, to apply them in the form of liquid compositions, or in combination with other vehicles or extenders comprising a minor amount of the active ingredient. For example, the compounds may be mixed with a dust or any convenient finely divided solid carrier which will aid in their uniform distribution.

Some of the useful solid carriers are finely divided kaolinite, bentonite, talc, attapulgite and the like. When preparing a dust formulation, a more even distribution of chemical can be obtained if it is dissolved in a volatile solvent prior to mixing. After mixing, the solvent is evaporated by any convenient method. Any solvent in which the active ingredient is soluble and which may be readily removed by evaporation is acceptable.

Liquid compositions may be dispersions or emulsions. Since the compounds having utility in the practice of this invention are substantially water insoluble, it is desirable to add a small amount of an inert, non-phytotoxic organic solvent which can be readily dispersed in the aqueous medium to produce a uniform dispersion of the active component. An effective liquid composition will include the active component, acetone, water, and a surface active agent such as Tween-20 (polyoxyethylene sorbitan monolaurate) or any of the other well-known agents such as Atlox G-3396 and Atlox G-2081, which are, respectively, a blend of polyoxyethylene sorbitol esters of mixed fatty and resin acids and alkyl aryl sulfonates, and a blend of polyoxyethylene sorbitan esters of fatty and resin acids and alkyl aryl sulfonates.

For the control of insects, the active ingredients are used at concentrations of from about 0.01% to about 1% of the total formulations. As nematocides, they are effective within the range of about 2 to 32 pounds per acre. It is contemplated, of course, that the ranges shown are not unnecessarily to limit the amounts to be applied. Under ideal conditions, and considering the variety of pest to be controlled within a given category, the lower rate may be more than adequate for protection. Furthermore, while as a general proposition it will not be necessary to add more than the higher rates shown, such things as adverse weather conditions, resistance of the pest, and the like may require that more of the active ingredient be used.

When treating for insects or nematodes it is necessary only to apply sufficient of the material to assure contact with the pests. For example, when treating the surfaces of plants infested with insects, control can be achieved by dusting in the manner as with other materials such as DDT, or by spraying a liquid formulation just to the point of run-off.

When the insect, as well as the nematode, is soil-borne, the solution, dispersion, or solid formulation may be distributed evenly over the area to be treated in any convenient manner. Where the formulation is liquid, the active component may be washed in by spraying water over the area, or it may be left to the natural action of rainfall. The solid formulations, after distribution, may be mixed with the soil by plowing, disking, etc. Liquid applications may be plowed or disked into the soil also. In any event, for the control of nematodes and burrowing insects, the active ingredient will have to be dispersed down to a depth of about 8 inches.

The following examples will illustrate specific processes for preparing the compounds of this invention. It will be understood that all of the compounds disclosed herein may be prepared by following the procedures specified below.

EXAMPLE 1

To a mixture of 160 parts (by weight here and throughout) of 25% sodium hydroxide in water and 165 parts of hexane was added 90.18 parts of butyl mercaptan. The addition was made at 25° C. and required about 10 minutes. The resulting mixture was cooled to 0° C., and there was added 58.5 parts of methylphosphonous dichloride at −5° C. to 0° C.

Additional 25% sodium hydroxide was added during the addition of the dichloride to keep the mixture basic to bromthymol blue. The mixture was allowed to warm to room temperature while stirring vigorously. The salt was removed by filtration, and then the hexane layer was washed with 200 parts of 5% sodium hydroxide, whereupon the hexane was removed by distillation to a final pressure of 30 mm. and a final temperature of 100° C. Upon distillation, 73.9 parts of S,S-dibutyl methylphosphonodithioite boiled at 90–95° C. at 0.2 mm.

EXAMPLE 2

A mixture of 22.44 parts of the compound of Example 1 and 3.2 parts of sulfur was heated at 100° C. under a nitrogen atmosphere until all of the sulfur had reacted. The reaction was strongly exothermic and required cooling and then alternate cooling and heating to maintain the temperature at 100°. Distillation of the product mixture gave 18.7 parts of S,S-dibutyl methylphosphonotrithioate boiling at 120–125° C. at 0.25 mm.

EXAMPLE 3

In this example, S,S-diisopropyl methylphosphonodithioite was used as the starting material for the oxidized product. The starting material was made as in Example 1, except that isopropyl mercaptan was used.

13.1 parts of the dithioite was dissolved in 44 parts of benzene. The solution was heated to 80° C., and 9.1 parts of 50% hydrogen peroxide was added thereto. Heating was continued for 5 minutes at 80° C., at which time the reaction was substantially complete. The aqueous and organic layers were separated and the benzene layer was washed with 25 parts of 5% sodium hydroxide. The benzene was removed, first at atmospheric pressure, then to 100° C. at 30 mm., whereupon the crude product was distilled. 9.2 parts of S,S-diisopropyl methylphosphonodithioate boiled at 70–75° C. at 0.3 mm. of Hg.

In Examples 1, 2 and 3, the compounds are represented by the formulas $(C_4H_9S)_2PCH_3$, $(C_4H_9S)_2P(S)CH_3$, and $(iso-C_3H_7S)_2P(O)CH_3$, respectively.

The nematocidal activity of the compounds disclosed herein can be illustrated by the following example.

EXAMPLE 4

Sterile test soil was infested by mixing it with soil in which root knot infested tomato plants had grown for three months. Enough soil to fill three four-inch pots was removed and placed in a metal tray and was mixed with 38 mg. or 19 mg. of the test compounds (corresponding to 32 or 16 pounds per acre), 50 mg. of Tween-20 and 126 ml. of water.

The soil was repotted and placed in a sand bench for two weeks, receiving normal greenhouse watering during this period. At the end of this period a tomato seedling (three weeks old) was transplanted to each pot. The seedling was allowed to grow for about thirty to thirty-five days. At the end of this period the plant was uprooted and two grams of the roots were cut away. The root knots were counted and rated according to the following scale.

No. of knots/2 gms. of roots: Rating
0 _____ A
1–10 _____ B
11–20 _____ C
21–30 _____ D
31 or above _____ E The results given in the table below are averages of the three replicates at each concentration.

Table 1

| Compound | Control Rating | |
|---|---|---|
| | 32 lbs./acre | 16 lbs./acre |
| $(C_2H_5S)_2PCH_3$ | A | A |
| $(C_3H_7S)_2PCH_3$ | A | A |
| $(C_4H_9S)_2PCH_3$ | A | A |

As an illustration of the insecticidal activity possessed by the compounds of this invention, the following is offered.

EXAMPLE 5

Three grams of whole wheat flour was placed in a 20 x 90 petri dish. One ml. of acetone containing the active component was poured over the flour and was thoroughly mixed therewith. After ample time for complete evaporation of the acetone (about 2 hours), the flour was removed to one side so that it covered about one-half of the dish. Adult confused flour beetles, *Tribolium confusum*, were placed in the flour, and the dish and flour were covered with cheese cloth. The tests were run in triplicate at each concentration, and the results were taken after 48 hours. The results in the following table are averages of the replicate tests.

Table 2

| Compound | Rate, mg. | Percent Kill |
|---|---|---|
| $(C_4H_9S)_2PCH_3$ | 8 | 100 |
| | 4 | 100 |
| $(C_3H_7S)_2PCH_3$ | 8 | 100 |
| | 4 | 100 |
| | 2 | 100 |
| | 1 | 100 |
| $(C_3H_7S)_2P(S)CH_3$ | 8 | 100 |
| | 4 | 100 |
| $(C_4H_9S)_2P(S)CH_3$ | 8 | 100 |
| | 4 | 100 |
| $(C_3H_7S)_2P(O)CH_3$ | 8 | 100 |
| | 4 | 100 |
| $(C_2H_5S)_2P(O)CH_3$ | 8 | 100 |
| | 4 | 83 |

It is to be understood that those compounds shown under Examples 4 and 5 are merely for the purposes of illustration, and are not unnecessarily to limit the scope of the invention. As an indication of the true scope of the invention, the following compounds will be found among those which have the utilities disclosed herein.

(1) $RP(SR')_2$

| | |
|---|---|
| $CH_3P(SC_5H_{11})_2$ | $C_4H_9P(SC_3H_7)_2$ |
| $CH_3P(SC_6H_{13})_2$ | $C_4H_9P(SC_4H_9)_2$ |
| $C_2H_5P(SCH_3)_2$ | $C_4H_9P(SC_5H_{11})_2$ |
| $C_2H_5P(SC_2H_5)_2$ | $C_4H_9P(SC_6H_{13})_2$ |
| $C_2H_5P(SC_3H_7)_2$ | $C_5H_{11}P(SCH_3)_2$ |
| $C_2H_5P(SC_4H_9)_2$ | $C_5H_{11}P(SC_2H_5)_2$ |
| $C_2H_5P(SC_5H_{11})_2$ | $C_5H_{11}P(SC_3H_7)_2$ |
| $C_2H_5P(SC_6H_{13})_2$ | $C_5H_{11}P(SC_4H_9)_2$ |
| $C_3H_7P(SCH_3)_2$ | $C_5H_{11}P(SC_5H_{11})_2$ |
| $C_3H_7P(SC_2H_5)_2$ | $C_5H_{11}P(SC_6H_{13})_2$ |
| $C_3H_7P(SC_3H_7)_2$ | $C_6H_{13}P(SCH_3)_2$ |
| $C_3H_7P(SC_4H_9)_2$ | $C_6H_{13}P(SC_2H_5)_2$ |
| $C_3H_7P(SC_5H_{11})_2$ | $C_6H_{13}P(SC_3H_7)_2$ |
| $C_3H_7P(SC_6H_{13})_2$ | $C_6H_{13}P(SC_4H_9)_2$ |
| $C_4H_9P(SCH_3)_2$ | $C_6H_{13}P(SC_5H_{11})_2$ |
| $C_4H_9P(SC_2H_5)_2$ | $C_6H_{13}P(SC_6H_{13})_2$ |

(2) $RP(S)(SR')_2$

Those compounds of (1) with sulfur attached to the phosphorus coordinate bond.

(3) $RP(O)(SR')_2$

Those compounds of (1) with oxygen attached to the phosphorus coordinate bond.

As used herein, the term "insecticide" will be understood to encompass the use of the compounds of this invention against true insects as well as against spiders, mites, ticks and similar pests which are not, biologically speaking, insects. Also, the term soil, as used in the specification is meant to include all conventional "soils" as stated in Webster's New International Dictionary, second edition, unabridged, published in 1954 by G. & C. Merriam Company, Springfield, Massachusetts. The term is meant to include any substance or medium in which vegetative organisms may take root and grow. The term includes not only earth, but also any manure, mulch, etc., which can support plant life.

I claim:

1. A method of controlling insects and nematodes which comprises applying thereto a pesticidal amount of a compound of the formula

RPX wherein R is an alkyl group containing from 1 to 6 carbon atoms and X is a member of the group consisting of —$(SR')_2$, —$(S)(SR')_2$ and —$(O)(SR')_2$, in which R' is an alkyl group containing from 1 to 6 carbon atoms.

2. A method of controlling insects and nematodes which comprises applying thereto a pesticidal amount of a compound of the formula $$RP(SR')_2$$

wherein R and R' are alkyl groups containing from 1 to 6 carbon atoms.

3. The method of claim 2 wherein the compound is $(C_2H_5S)_3PCH_3$.

4. The method of claim 2 wherein the compound is $(C_3H_7S)_2PCH_3$.

5. The method of claim 2 wherein the compound is $(C_4H_9S)_2PCH_3$.

6. A method of controlling insects and nematodes which comprises applying thereto a pesticidal amount of a compound of the formula $$RP(S)(SR')_2$$

wherein R and R' are alkyl groups containing from 1 to 6 carbon atoms.

7. The method of claim 6 in which the compound is $(C_3H_7S)_2P(S)CH_3$.

8. The method of claim 6 in which the compound is $(C_4H_9S)_2P(S)CH_3$.

9. A method of controlling insects and nematodes which comprises applying thereto pesticidal amount of a compound of the formula $$RP(O)(SR')_2$$

wherein R and R' are alkyl groups containing from 1 to 6 carbon atoms.

10. The method of claim 9 in which the compound is $(C_2H_5S)_2P(O)CH_3$.

11. The method of claim 9 in which the compound is $(C_3H_7S)_2P(O)CH_3$.

References Cited in the file of this patent

UNITED STATES PATENTS

| | | |
|---|---|---|
| 2,881,201 | Schrader | Apr. 7, 1959 |
| 2,962,521 | Usui | Nov. 29, 1960 |
| 3,014,955 | Beriger | Dec. 26, 1961 |
| 3,016,326 | Beriger | Jan. 9, 1962 |

OTHER REFERENCES

Bull. Acad. Sci. U.S.S.R. Div. Chem. Sci., No. 2 February 1957, pp. 189–195.